US012695350B2

(12) United States Patent
Humphrey et al.

(10) Patent No.: US 12,695,350 B2
(45) Date of Patent: Jul. 28, 2026

(54) ELECTRIC MACHINE WEDGES AND METHOD FOR INSERTION OF WEDGES

(71) Applicant: BorgWarner Inc., Auburn Hills, MI (US)

(72) Inventors: Stephen Humphrey, Anderson, IN (US); Kirk Neet, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 194 days.

(21) Appl. No.: 18/441,426

(22) Filed: Feb. 14, 2024

(65) Prior Publication Data

US 2024/0275228 A1      Aug. 15, 2024

Related U.S. Application Data

(60) Provisional application No. 63/485,152, filed on Feb. 15, 2023.

(51) Int. Cl.
*H02K 3/487* (2006.01)
*H02K 3/34* (2006.01)
*H02K 15/13* (2025.01)

(52) U.S. Cl.
CPC ............. *H02K 3/487* (2013.01); *H02K 3/345* (2013.01); *H02K 15/13* (2025.01)

(58) Field of Classification Search
CPC .......... H02K 3/34; H02K 3/345; H02K 3/487; H02K 3/493; H02K 15/13
USPC ................................................. 310/214, 215
See application file for complete search history.

(56) References Cited

U.S. PATENT DOCUMENTS

| | | | | |
|---|---|---|---|---|
| 4,780,636 A | * | 10/1988 | Gandhi ................... | H02K 1/165 310/216.069 |
| 6,278,213 B1 | | 8/2001 | Bradfield | |
| 2007/0222323 A1 | * | 9/2007 | Neet ...................... | H02K 3/345 310/215 |

FOREIGN PATENT DOCUMENTS

JP          2006121864 A  *  5/2006

OTHER PUBLICATIONS

Ishiguro Kunitomo, Insertion Method and Coil Inserting Device, May 11, 2006, JP 2006121864 (English Machine Translation) (Year: 2006).*

* cited by examiner

*Primary Examiner* — Alexander A Singh
(74) *Attorney, Agent, or Firm* — Maginot, Moore & Beck, LLP

(57)          ABSTRACT

A stator for an electric machine includes a stator core defining an axial direction, a first end, and a second end. The stator core includes a plurality of slots formed between a plurality of teeth, wherein each of the plurality of slots extend from the first end to the second end of the stator core and define a slot opening on a radially inward portion of the stator core. A plurality of conductors are positioned in each of the slots and are connected together to form a winding arrangement for the stator. A wedge is positioned in each slot of the stator core radially inward from the plurality of conductors positioned in said slot. The wedge includes a first leg positioned on one side of the slot, a second leg positioned on an opposite side of the slot, and a bridge spanning across the slot opening.

22 Claims, 7 Drawing Sheets

ELECTRIC MACHINE WEDGES AND METHOD FOR INSERTION OF WEDGES

CROSS-REFERENCE TO RELATED APPLICATIONS

The present application claims the benefit of U.S. provisional application No. 63/485,152, filed Feb. 15, 2023, the entire contents of which are incorporated by reference herein.

FIELD

The present disclosure relates to the field of electric machines, and more particularly, products and methods for inserting and retaining winding arrangements within a core of an electric machine, such as a stator core.

BACKGROUND

Electric machines, and particularly electric motors, are designed with conductors that extend through a stator core. Efficient insertion and reliable retention of the conductors within the stator core is a significant design consideration. Numerous performance considerations should be accounted for when designing and assembling the electric machine. One of these performance considerations is the amount of partial discharge (PD) occurring within the electric machine. The term "partial discharge" generally refers to an electrical discharge occurring in any part of a rotating electrical machine, such as a surface discharge generated along the surface of the insulating film, or a void discharge occurring in the pores in the insulating material. When testing an electrical machine for proper performance, the partial discharge inception voltage (PDIV) is measured to insure that the PD is within a desired range. However, obtaining accurate PDIV measurements can be challenging.

In view of the foregoing, it would be desirable to provide an electric machine with features that facilitate insertion and retention of conductors within the stator core. It would also be desirable if such features improved the performance and/or testing results for the electric machine, such as features that provide improved PDIV measurements.

SUMMARY

A stator for an electric machine and associated method of making a stator is disclosed herein. In at least one embodiment, the stator includes a stator core defining an axial direction, a first end, and a second end. The stator core includes an outer diameter wall and a plurality of teeth extending radially inward from the outer diameter wall with minicaps positioned at radially inward ends of teeth and extending in a circumferential direction. A plurality of slots are formed between the teeth, each of the plurality of slots extending from the first end to the second end of the stator core and defining a slot opening on a radially inward portion of the stator core between a pair of minicaps. A width of each slot opening is less than a width of each slot. A plurality of conductors are positioned in each of the slots. A wedge is positioned in each slot of the stator core radially inward from the plurality of conductors positioned in said slot. The wedge includes a first leg positioned on one side of said slot, a second leg positioned on an opposite side of said slot, and a bridge connecting the first leg to the second leg. The bridge spans across the slot opening and abuts a radially outward side of the pair of minicaps.

In at least one embodiment, an electric machine includes a rotor and a stator separated by an airgap. The stator includes a stator core with a winding arrangement positioned thereon. The stator core defines an axial direction and includes a plurality of slots with conductors that form the winding arrangement extending through the slots. Each slot of the stator core includes an opening to the slot formed on an inward portion of the stator core such that the slot may be accessed from a radial direction. The opening to the slot is sufficiently large to receive conductors into the slot from the radial direction. A wedge is positioned in each slot of the stator core. Each wedge is positioned radially outward from the opening to the associated slot, and at least a portion of each wedge is positioned radially inward from the conductors extending through the associated slot.

In at least one embodiment of the electric machine, a plurality of slot liners are positioned in the plurality of slots of the stator core. Each slot liner includes a first side positioned on one side of an associated slot and a second side positioned on a second side of the associated slot such that the conductors in the associated slot are positioned between the first side and the second side of the slot liner. A plurality of wedges are positioned in the slots of the stator core, wherein at least a portion of each wedge is positioned radially outward from an opening of the associated slot. Each wedge includes a first leg positioned between the first side of the slot liner and a radially innermost conductor in the associated slot, a second leg positioned between the second side of the slot liner and the radially innermost conductor in the associated slot, and a bridge extending between the first leg and the second leg. The bridge blocks an opening to the associated slot. Each wedge is friction fit in the slot with the first leg wedged on one side of said slot and the second leg wedged on an opposite side of said slot.

In at least one embodiment, a method of making a stator for an electric machine includes inserting conductors into slots of a stator core by inserting the conductors through slot openings in a radial direction. The method further includes inserting wedges through the slot openings in the radial direction and into the slots. Following insertion of a wedge though a slot opening, a first leg of a wedge is positioned between a first side of an innermost conductor and a first side of the slot, a second leg of the wedge is positioned between a second side of the innermost conductor and a second side of the slot, and a bridge of the wedge blocks the slot opening.

In at least one embodiment the method of making a stator for an electric machine includes inserting conductors into slots of a stator core, wherein the stator core defines an axial direction, a circumferential direction, and a radial direction. The stator core further includes an outer diameter wall and teeth extending radially inward from the outer diameter wall with minicaps positioned at radially inward ends of the teeth and extending in the circumferential direction. Slots are formed between the teeth. Each slot defines a slot opening positioned on a radially inward portion of the stator core between a pair of the minicaps. A width of each slot opening is less than a width of each slot radially outward from said slot opening. The conductors are inserted into the slots of the stator core through the slot openings. The method further includes inserting slot liners into the slots such that, for each slot liner, a first side of said slot liner is positioned on one side of an associated slot, a second side of said slot liner is positioned on an opposite side of the associated slot, and the conductors in the associated slot are positioned between the first side and the second side of the slot liner. Furthermore, the method includes inserting wedges through the slot openings in a radial direction and into the slots. The wedges are inserted into each slot such that (i) a first leg of a wedge is positioned between the one side of the slot liner and a radially innermost conductor in the slot, (ii) a second leg of the wedge is positioned between the opposite side of the slot liner and the radially innermost conductor in the slot, and (iii) a bridge of the wedge blocks the slot opening. Accordingly, each wedge is friction fit within an associated slot with the first leg wedged on the one side of said slot and the second leg wedged on the opposite side of said slot.

As will be appreciated from the disclosure herein, in at least some embodiments, the method of making the electric machine includes the use of wedges in association with the insertion and retention of conductors within the slots of the stator core. The stator core of the electric machine includes minicaps at an inner diameter of each lamination tooth, flared slots along an axial length of each slot and positioned slightly radially outward of the minicaps, and slot liners that terminate slightly radially outward of the minicaps. Wedges are inserted in a radial direction into each of the slots. Each wedge may be U-shaped and includes two long legs and a bridge that provides a connection portion between the two legs. In at least some embodiments the legs extend at least 2 mm radially outward from the bridge. Each wedge is press-fit into a slot with the leading edge of the legs inserted first. Each wedge is retained in a slot by (i) a friction-fit between the conductor wire and the slotliner/sides of the lamination teeth, and/or (ii) the placement of the wedge being tucked behind the minicaps within the slot.

The above described features and advantages, as well as others, will become more readily apparent to those of ordinary skill in the art by reference to the following detailed description and accompanying drawings. While it would be desirable to provide an assembly method and electric machine that provides one or more of these or other advantageous features as may be apparent to those reviewing this disclosure, the teachings disclosed herein extend to those embodiments which fall within the scope of any eventually appended claims, regardless of whether they include or accomplish one or more of the advantages or features mentioned herein.

DESCRIPTION

Figure 1A:
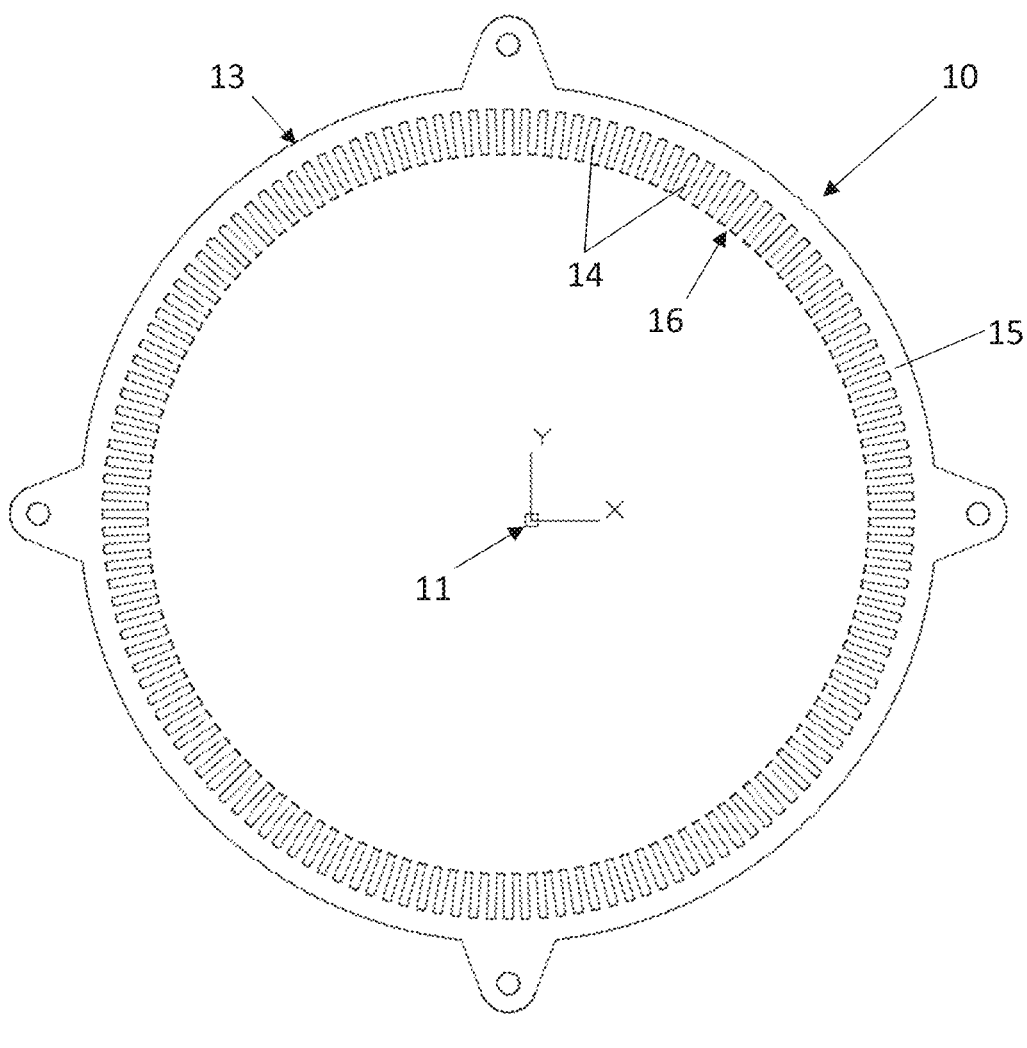
FIG. 1A shows a plan view of a stator core.
Figure 1B:
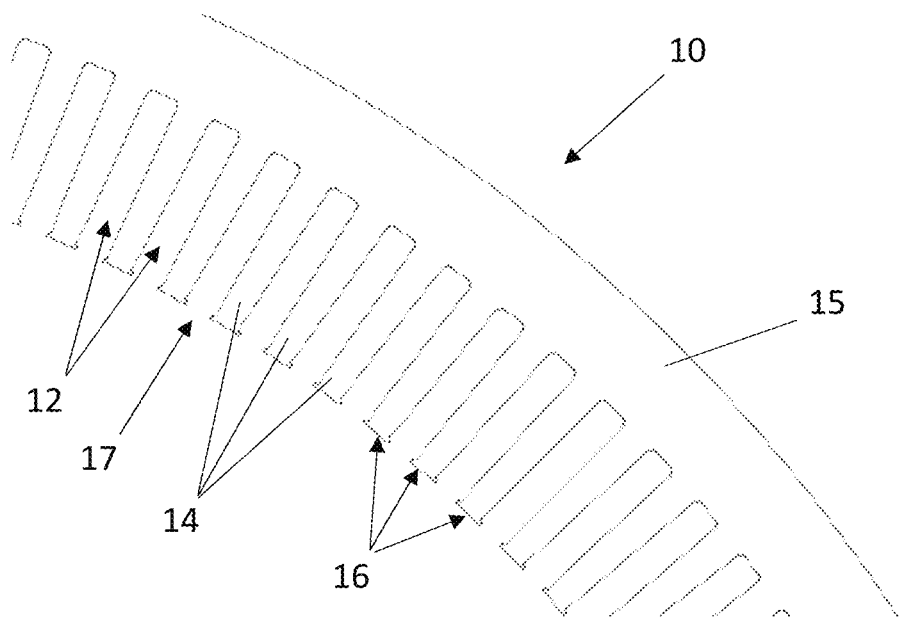
FIG. 1B shows an enlarged view of a portion of the stator core of FIG. 1B.
Figure 1C:
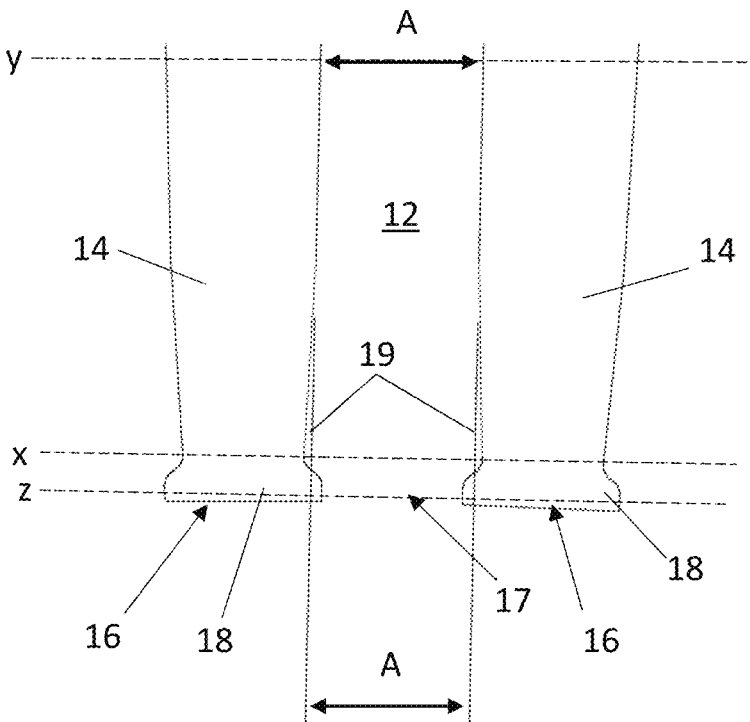
FIG. 1C shows a slot formed between two teeth of the stator core of FIG. 1A.

A stator assembly for an electric machine is disclosed herein and includes a stator core, a winding arrangement positioned thereon, and wedges arranged in slots of the stator core. In at least one embodiment, the wedges include two long legs and a connecting portion. The wedges are press-fit into each slot with the leading edge of each leg inserted first, followed by the connecting portion. The wedges serve to secure the conductors in place within the slots and also to provide improved PDIV measurements.
Stator Core Referring now to FIGS. 1A-1C, a stator includes a lamination stack that forms a generally cylindrically-shaped stator core 10 defined about a central axis 11 (i.e., an axis that extends outward and inward from the page in FIG. 1A). An axial direction on the stator is defined as a direction parallel to the central axis, a radial inward direction is defined as a direction towards the central axis 11 of the stator core 10, a radial outward direction is defined as a direction away from the central axis 11, and a circumferential direction is defined is defined as a direction moving around the central axis 11. FIG. 1C illustrates different positions along the slot with dotted lines "x," "y," and "z" (which are identified as "lines" in the figure, but actually represent arcs that are concentric with the central axis 11 of the stator core).

The stator core 10 includes a plurality of core slots 12 (or simply "slots") formed between a plurality of teeth 14. The teeth 14 extend in a radial inward direction from an outer diameter wall 15 of the stator core 10. The core slots 12 extend radially inward from a circumferential interior surface 16 of the stator core. The core slots 12 and the teeth 14 also extend in an axial direction, parallel to the central axis 11 of the stator core 10, between a first end 13 and a second end (not shown) of the stator core (i.e., the first end 13 opposite the second end of the stator core in the axial direction). The core slots 12 and the associated teeth 14 are equally spaced around the circumferential inner surface 16 of the stator core 10, and the respective inner surfaces 16 of the teeth 14 extend axially parallel to the central axis 11.

As best shown in FIG. 1C, each tooth 14 of the stator core includes a minicap 18 positioned on the radially inward end of the tooth. The minicaps 18 are bulging portions/protuberances that extend circumferentially outward on opposing sides of each tooth 14 at the radially inward end of the tooth. (These protuberances may also be referred to as "feet" at the ends of a tooth.) Opposing pairs of minicaps 18 on adjacent slot teeth form gateways that result in semi-closed slot openings 17 (associated with line "z" in FIG. 1C). Accordingly, the circumferential width of each slot 12 is smaller at the minicaps 18 than at the more central portions of the slot 12. For example, as shown in FIG. 1C, the width of the slot 12 is less than "A" at the slot opening 17 (e.g., along line "z") along the circumferential inner surface 16 of the stator core 10, and is equal to "A" at a more central position of the slot 12 (e.g., along line "y").

As also shown in FIG. 1C, the radially inward end of each tooth 14 is slightly tapered in a circumferentially inward direction moving radially inward along the tooth. As a result, the width of each tooth 14 is slightly smaller at a position immediately radially outward from the minicaps 18 than at a position further radially outward from the minicaps 18 (e.g., the tooth 14 of FIG. 1C is slightly thinner along line "x" than along line "y"). Conversely, the slot 12 is slightly wider at the position immediately radially outward from the minicaps 18 than at a more central position of the slot (e.g., the slot 12 is slightly wider along line "x" than along line "y").

The tapered nature of the slot 12 is further illustrated in FIG. 1C by the lines 90 that identify the slot width "A". As shown in the figure, the slot 12 has a constant width "A" from the back of the slot (i.e., the radially outward-most position near the outer diameter wall 15) and radially inward to a position about ⅓ of the total slot length from the opening of the slot 12. At this point, the lines 90 illustrate that tapered surfaces 19 drift gradually circumferentially outward to the back sides of the two minicaps 18 on opposing sides of the associated slot. Accordingly, approximately a radially outward ⅔ of each slot has a constant width, and approximately a radially inward ⅓ of each slot has a gradually increasing width moving in the radially inward direction. Each tapered surface 19 defines an angle of approximately 2 degrees relative to the two parallel lines that identify width "A" for the associated slot 12. This results in each slot 12 having a slightly flared-open shape at a position immediately radially outward from the minicaps 18. For example, as shown in FIG. 1C, the width of the slot 12 is greater than "A" along line "x" immediately outward from the minicaps 18, and is equal to "A" along line "y" at a more central position of the slot 12 (e.g., the slot width is equal to "A" at a radial midpoint of the slot). This angle of approximately 2 degrees helps in avoiding damage to the slot liner 30 during wire insertion and gives space for the legs 42 of the wedge 40 (shown in FIG. 2) to fit between the conductor wire 20, slot liner 30, and sidewalls of the teeth 14 during the wedge insertion process, which is described in further detail below (with reference to FIG. 4).

Conductors and Slot Liners

Figure 2:
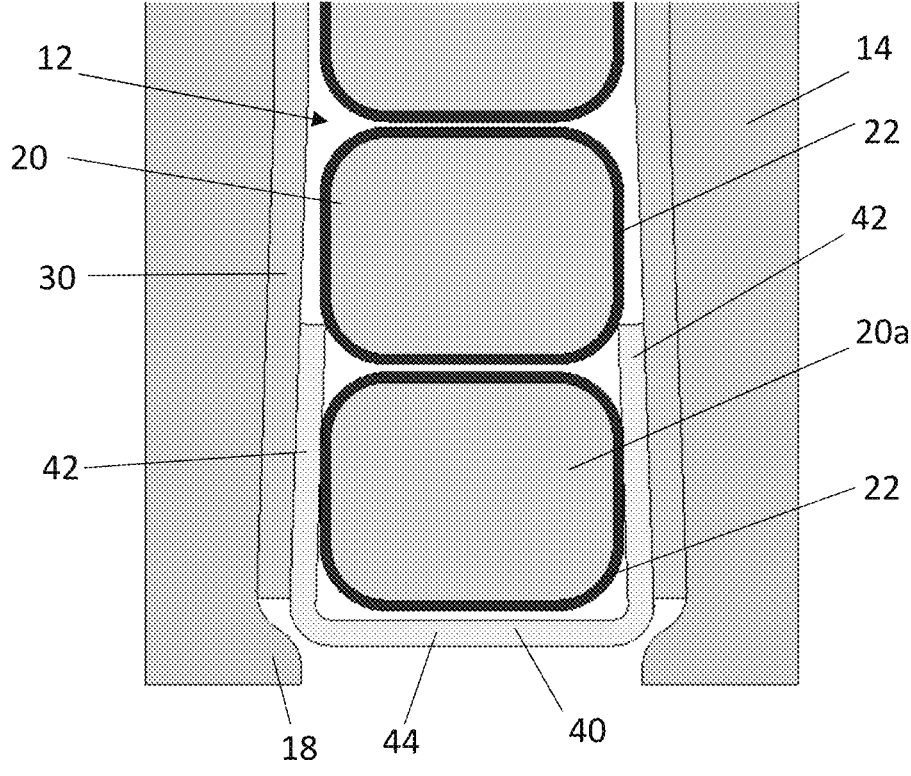
FIG. 2 shows a cross-sectional view of the slot of FIG. 1C with electrical conductors, a slotliner, and a wedge positioned in the slot.

With particular reference now to FIG. 2, a close-up cross-sectional view of an interior portion of a slot 12 of a completed stator is shown. Each slot 12 of the stator core 10 is populated with electrical conductors 20 used to form a winding arrangement on the stator. The conductors are generally copper wires or wire segments, and are shown in FIG. 2 as having a generally rectangular shape. The conductors 20 may be insulated with an insulative coating 22 (e.g., a polymer such as PVC or other material). While substantially rectangular insulated conductors are shown in FIG. 2 (i.e., conductors that are rectangular with the exception of a surface feature such as a curved corner), it will be recognized that any of various shapes, sizes and forms of conductors may be used in the slots 12, as is common in the formation of stator windings, such as round conductors.

As shown in FIG. 2, the conductors 20 may be arranged in a single file row in each slot 12. For example, in at least some embodiments, six or eight conductors may extend through each slot, the conductors arranged in a single file row with each conductor associated with a "layer" of conductors within the slots. The width of each conductor 20 is less than the width of the associated slot (e.g., less than dimension "A" in FIG. 1). In at least some embodiments, the width of each conductor is sufficiently thin to allow the conductor to be inserted in the radial direction through the associated slot opening 17 (i.e., between the two minicaps 18 that define the slot opening). As will be recognized by those of ordinary skill in the art, end turns are arranged at the opposing ends of the stator and connect the conductors in each slot in order to form a winding arrangement with completed windings on the stator.

The sidewalls and the outer/back wall of each slot 12 are lined with a slot liner 30, as is conventional in association with many stators. The slot liners 30 are generally provided by a sheet of material comprised of insulative material such as Nomex® or Mylar®. The slot liners 30 are typically positioned in each slot prior to insertion of the conductors through the slot openings. Accordingly, it will be recognized that the conductors 20 are sufficiently thin to fit within the slots 12 with the slot liners 30 positioned along the opposing walls of the slot. Also, while the slot liners 30 may extend across the outer/back wall of each slot, they do not extend to the slot openings 17. Because the slot liners 30 do not block the slot openings 17 along the circumferential interior surface 16 of the stator core, the conductors 20 may be inserted into each slot in the radial direction.

Wedges

With continued reference to FIG. 2, a wedge 40 is positioned in each slot 12 on the inner portion of the slot. Each wedge 40 is generally an elongated/three-dimensional U-shaped object. Stated differently, each wedge 40 is a post-like structure with only three sides that form an interior channel, wherein the cross-section of the post-like structure is a U-shape. The three sides of the wedge 40 are provided by two opposing legs 42 (which may alternatively be referred to as "wings") that are connected by a bridge 44 (which may also be referred to as a "connecting portion"). The bridge 44 provides the middle portion of the post-like structure, and the legs 42 provide two opposite sides of the structure. The legs 42 and bridge 44 are generally similar in axial length. However, in at least some embodiments, the legs and/or bridge may have different lengths wherein the bridge 44 is not as long as the legs 42, or vice-versa.

Each wedge 40 is positioned in an associated slot 12 such that each opposing leg 42 of the wedge 40 extends inwardly into the slot 12 from a position near the minicaps 18. The terminal end of each leg 42 may extend to a position past (i.e., radially outward from) the inward-most conductor (which may also be referred to herein as an "innermost" conductor) in the slot 12. For example, the terminal end of each leg 42 may abut the conductor in the penultimate layer of the slot 12 (i.e., the second conductor moving radially outward from the slot opening 17). The bridge 44 of the wedge extends across the back side of the two minicaps 18 and substantially or completely blocks the slot opening 17 defined between the two minicaps 18 (i.e., the bridge of the wedge either contacts the minicaps 18 or is within a distance that is much less than the width of a conductor, such as 10% or less of the width of the conductor). In at least some embodiments, the radially inward side of the bridge 44 abuts the radially outward side of the endcaps 18 in the associated slot 12.

Each wedge 40 is a unitary member such that the legs 42 are integrally formed with the bridge 44. Accordingly, the wedge 40 is a monolithic structure with different portions that cannot be released from other portions without damage to the structure as a whole. Each wedge is generally comprised of an electrically insulative material (i.e., a material that does not readily conduct electricity and is commonly used for electrically insulating purposes). In at least one embodiment, the wedge 40 a three-ply laminate which includes a paper (e.g., Nomex®) on the inner and outer sides of the laminate, and a plastic or thermoplastic (e.g., Mylar®) in the middle of the laminate. In this embodiment, the plastic/thermoplastic material has high stiffness and gives the wedge legs a sufficient column strength to be inserted between the conductors 20 and slot liner 30. In at least one embodiment, the wedge is comprised of 100% material with high column strength (e.g., a plastic or thermoplastic, such as Mylar, Kapton or PEEK). In various embodiments, the material that forms the wedge 40 is also sufficiently flexible to allow the bridge 44 to slightly bend, if needed, in order to slide past the slot openings 17 and into the slots 12, as described in further detail below.

The wedge 40 is held in place in the slot 12 by a press-fit/friction-fit along the teeth 14 defining the sides of the slot 12. As shown in FIG. 2, the two long legs 42 of the wedge 40 extend deep into the slot, and the legs 42 are wedged between the conductor 20 and the slot liner 30/tooth 14. The legs 42 are slightly longer than one wire/conductor thickness (i.e., the radial direction dimension) and are generally longer than 2 mm. For example, in at least some embodiments, the legs 42 may extend 2.2 mm outward from the bridge 44 and past the conductor in the innermost layer of the associated slot, provided the innermost conductor has a thickness of less than 2.2 mm. In at least some embodiments, the legs extend a sufficient length to contact the conductor in the penultimate layer of the slot. The legs 42 are advantageously wedged between the innermost conductor 20 and help retain the wedge 40 in place as well as improve PDIV electrical measurements.

As shown in FIG. 2, the thickness of the wedge 40 may be generally uniform across the legs 42 and the bridge 44. However, in at least some embodiments, the legs 42 are slightly thinner in thickness than the bridge 44. This may be the result, at least in part, from the friction-fit of the wedge 40 within a slot 12, and the associated compression on the legs 42 when they are squeezed between the conductors 20 and the slot liner 30 in each slot, as explained in further detail below.

Electric Machine With Wedges in Stator Slots

Figure 3:
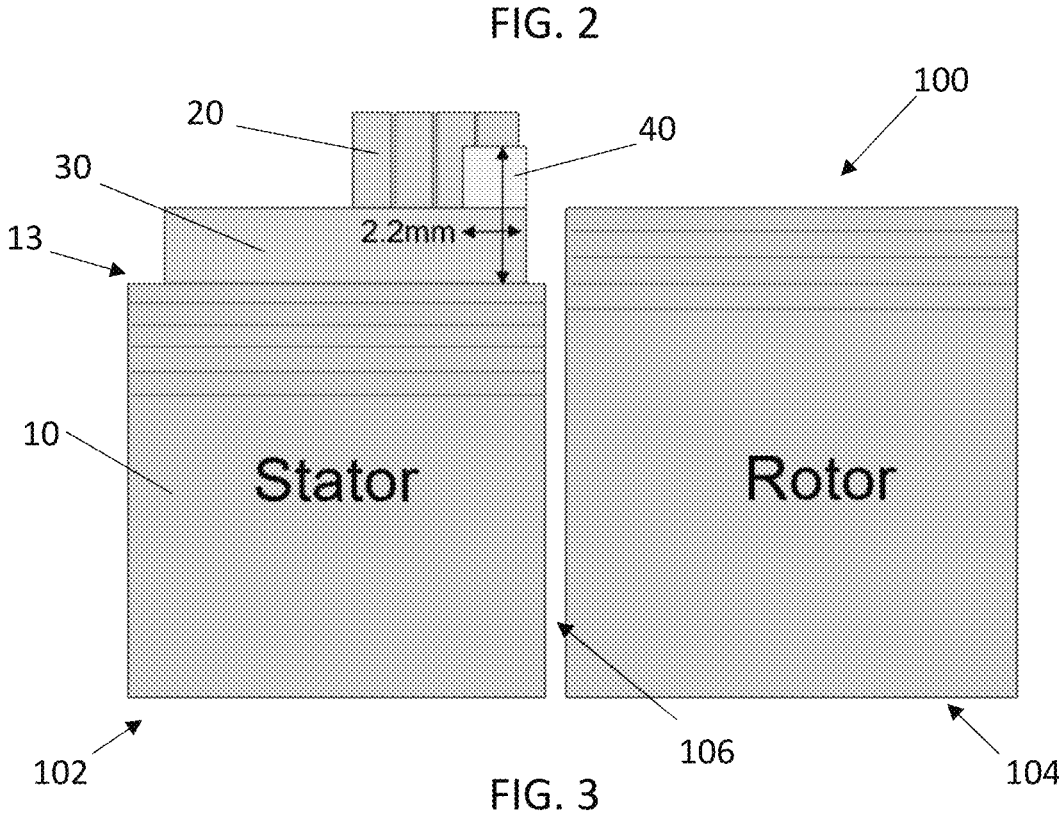
FIG. 3 shows a side view of a portion of a stator and a portion of a rotor of an electric machine with the electrical conductors, slotliner and wedge of FIG. 2 extending axially outward from the stator.

With reference now to FIG. 3, a diagram is shown illustrating a partial cross sectional view of an electric machine 100. The electric machine includes both a stator 102 and a rotor 104. An airgap 106 separates the stator 102 from the rotor 104. The stator 102 includes a stator core 10, as described above, including conductors 20, slot liners 30, and wedges 40 positioned in the slots of the stator core 10. As shown in the figure, each slot liner 30 protrudes axially outward from an associated slot of the stator core 10. For example, the slot liner 30 may protrude about 1-4 mm past the end 13 of the stator core 10 (e.g., about 2.2 mm past the stator core 10). While only one end 13 of the stator core 10 is shown in FIG. 3, it will be recognized that the slot liner may also extend from an opposite end of the stator core.

The wedge 40, including both the legs 42 and the bridge 44, is longer than the slot liner 30 in the axial direction. Therefore, as shown in FIG. 3, the wedge 40 protrudes an additional distance past the end (or ends) of the stator core 10, such as 2-5 mm further outward from the slot (e.g., about 4 mm past the stator core) at one or both ends of the stator core. Because the wedge 40 is longer than the slot liner 30, and extends further than the slot liner 30 at the ends of the stator core 10, the wedge 40 serves to further protect the conductors 20 that form the winding arrangement on the stator 102 from electrically shorting to the rotor 104.

Method of Inserting Wedge Into Slot

Figure 4:
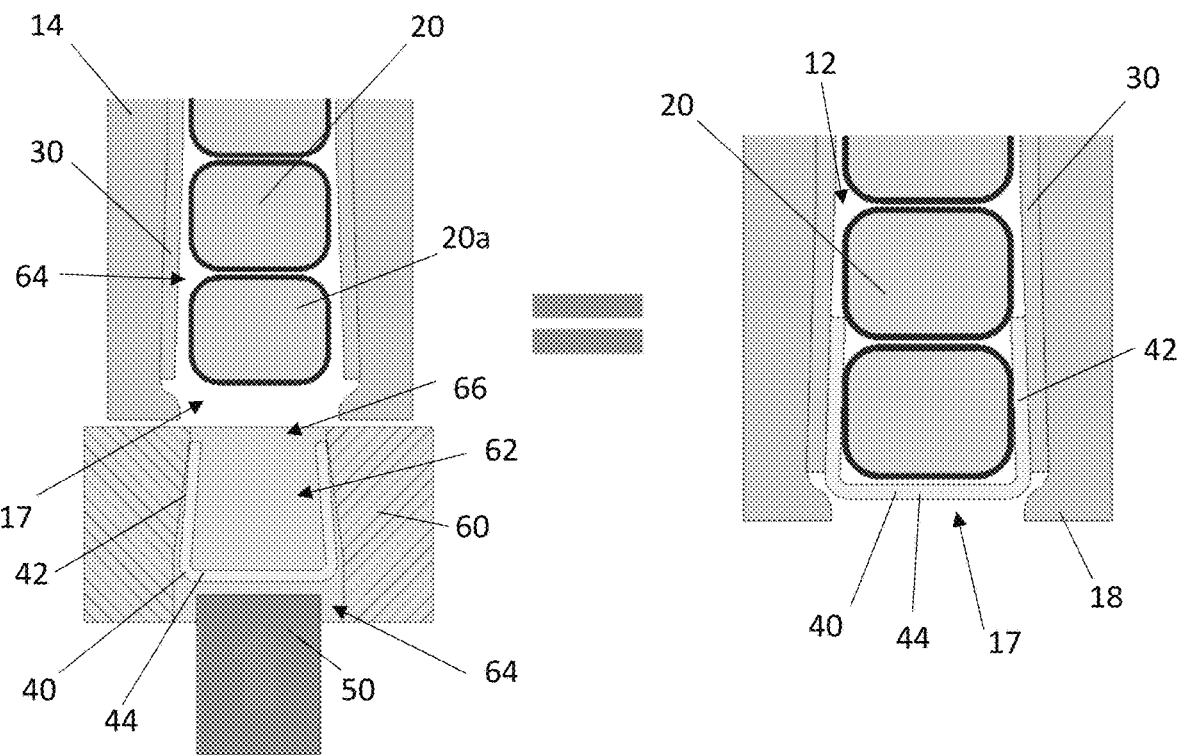
FIG. 4 is a diagram illustrating the steps of a method of inserting the wedge of FIG. 2 into the slot.

With reference now to FIG. 4, a diagram illustrating a process for inserting the conductors 20 and the wedges 40 into the stator slots is shown. As discussed previously, the openings 17 to the slots 12 are defined between the minicaps 18 and are sufficiently large to allow the insulated conductor wire 20 to be inserted radially into the slots 12 from the inner diameter of the stator core 10. The openings 17 defined between the minicaps 18 are also small enough such that the bridge 44 of the wedge 40 is slightly bent/deformed when sliding the bridge 44 through the openings at the time the wedge 40 is radially inserted into the slots.

As illustrated in FIG. 4, the wedges 40 are inserted into the slots 12 in a radial direction through the semi-closed openings 17. In order to accomplish this, a guide fixture 60 is positioned against the circumferential interior surface 16 of the stator core, and a pusher tool 50 is engaged with the guide fixture 60. The pusher tool 50 presses a wedge 40 positioned in a through-hole of the guide fixture radially outward and into one of the slots, as shown in FIG. 4.

As shown in FIG. 4, the guide fixture 60 is a block-like structure that includes a through-hole 62 that extends from a radially inward side of the fixture to a radially outward side of the fixture. A first opening 64 to the through-hole is defined on a radially inward side of the guide fixture 60 and a second opening 66 is defined on a radially outward side of the guide fixture 60. The first opening 64 is larger than the second opening 66. The first opening 64 is generally slightly larger than that of the slot openings 17, and the second opening 66 is generally slightly smaller than that of the slot openings 17. Accordingly, the through-hole is tapered accordingly from the first opening 64 to the second opening 66. In the embodiment of FIG. 4, the through-hole 62 is generally cylindrical in shape for a first radially inward portion of the guide fixture (i.e., the diameter of the through-hole is consistent for the first portion of the guide fixture), and then the through-hole 62 is frustoconical in shape for a second radially outward portion of the guide fixture (i.e., the diameter of the through-hole gradually tapers from that of the first opening 64 to that of the second opening 66 for the second portion of the guide fixture). As shown in FIG. 4, this shape advantageously retains the wedge 40 with the legs 42 in contact with the radially outward portion of the through hole and ready for placement by the pusher tool 50.

The guide fixture 60 is generally comprised of a relatively rigid strong material. For example, the guide fixture 60 may be formed from a plastic or a metal material. As explained in further detail below, the guide fixture has sufficient strength to retain the wedges 40 and guide them into the slots 12 of the stator with the assistance of the pusher tool 50. Also, while the guide fixture 60 is shown in FIG. 4 as being associated with only one slot 12 (i.e., the guide fixture 60 shown in FIG. 4 is only equipped to insert one wedge into one slot), in at least some embodiments, the guide fixture may be used in association with multiple slots. For example, the guide fixture 60 may be provided as a disc-like structure with multiple through-holes 62, wherein the guide fixture 60 is configured to be placed within the interior surface 16 of the stator core with each through-hole 62 of the guide fixture 60 associated with and aligned with one of the slots of the stator core 10.

The pusher tool 50 is configured to force a wedge 40 through a through-hole 62 of the guide fixture and into one of the slots. The pusher tool 50 is generally an elongated rod/post or similar structure and is configured to extend through each through-holes 62 of the guide fixture 60. The pusher tool 50 is comprised of a relatively rigid and strong material such as a rigid plastic or a metal material. As explained in further detail below, the guide fixture has sufficient strength to force each wedge 40 through a through-hole 62 and into a slot 12 of the stator core 10.

Figure 5:
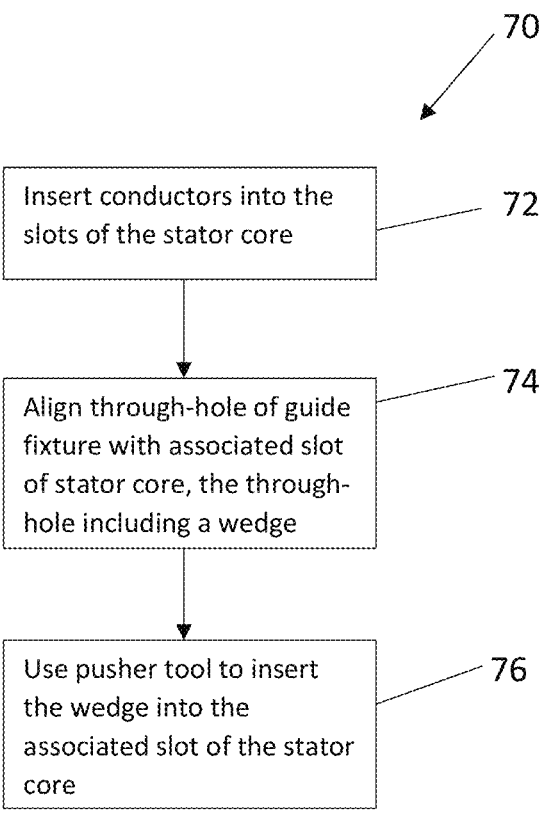
FIG. 5 is a block diagram of the method of FIG. 4.

FIG. 5 is a block diagram illustrating a method 70 of assembling a stator for an electric machine using the guide fixture 60 and pusher tool 50 in association with a stator core 12. As shown in FIG. 5, the method begins at block 72 with the insertion of conductors 20 into the slots 12 of a stator core 10. In at least some embodiments, this is accomplished by inserting the conductors through slot openings 17 in a radial direction.

As noted at block 74, after the conductors 20 are inserted into the slots 12, the guide fixture 60 is moved into the central area of the stator core 10 with at least one through-hole 62 of the guide fixture 60 adjacent to and aligned with at least one slot 12 of the stator core 12. At this time, a wedge 40 is also positioned into each of the through-holes 62, as shown on the left hand side of the illustration of FIG. 4.

With the wedges 40 positioned in the through-holes 62 and the through-holes 62 aligned with the slots, the next step of the method 70 is for the wedges 40 to be inserted into the slots, as noted at block 76 of FIG. 5. In order to accomplish this, the pusher tool 50 is driven or otherwise forced through each through-hole 62 of the guide fixture 60 in a radially outward direction. As this occurs, the pusher tool 50 engages the bridge 44 of the wedge 40 positioned in the through-hole 62, and moves the wedge 40 in a radially outward direction. As the wedge 40 moves radially outward, the legs 42 of the wedge 40 slide along the tapered surface of the through-hole 62, and are directed circumferentially inward and into engagement with opposing sides of the radially innermost conductor (i.e., conductor 20a shown in FIG. 4). As the wedge 40 is forced even further in the radially outward direction, the first leg of the wedge 40 becomes compressed and wedged between a first side of the innermost conductor 20a and a first side of the slot 12 (and slot liner 30), and a second leg of the wedge 40 also becomes compressed and wedged between a second side of the innermost conductor 20a and a second side of the slot 12 (and slot liner 30). As shown in FIG. 4, the ends of the legs 42 may extend as far as to be in contact with the penultimate conductor in the slot 12. At this point, the bridge 44 of the wedge 17 forced past (i.e., radially outward from) the minicaps 18 and into the slot 12. In some embodiments, the bridge 44 may be in contact with the radially outward side of each minicap 18. In other embodiments, the bridge 44 may be slightly removed from the minicaps 18 (e.g., by less than 1 mm). Because the dimension of the bridge 44 is slightly larger than that of a slot opening 17, it will be recognized that the bridge 44 slightly bends or is otherwise deformed when it is forced through the slot opening 17.

Figure 6:
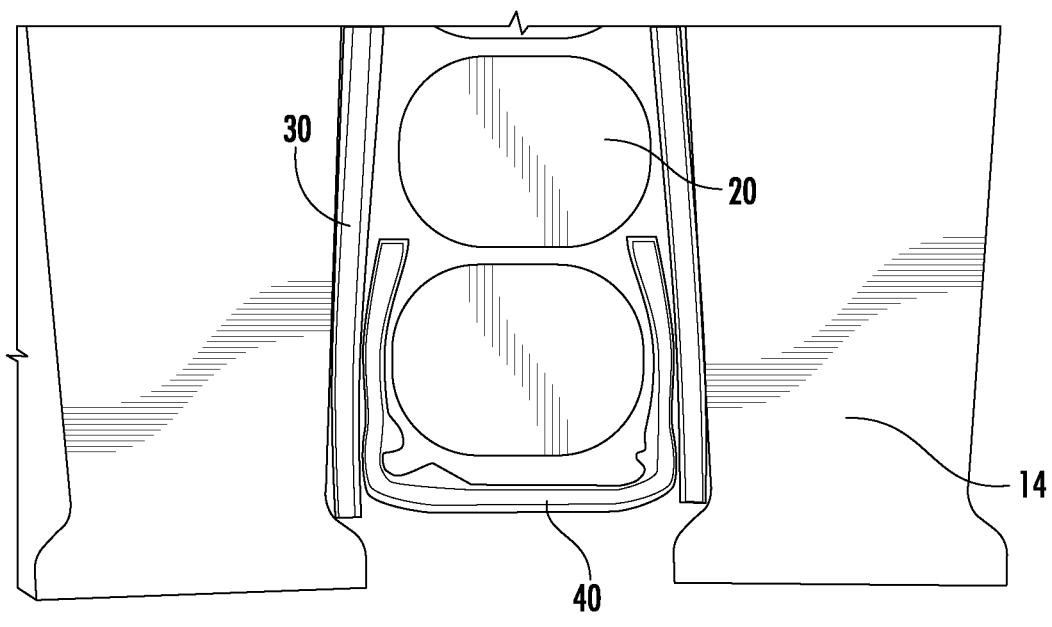
FIG. 6 is a cross-sectional close-up view of a slot of a stator including conductors, a slotliner, and a wedge positioned in a radially outward position following insertion of the wedge into the slot.
Figure 7:
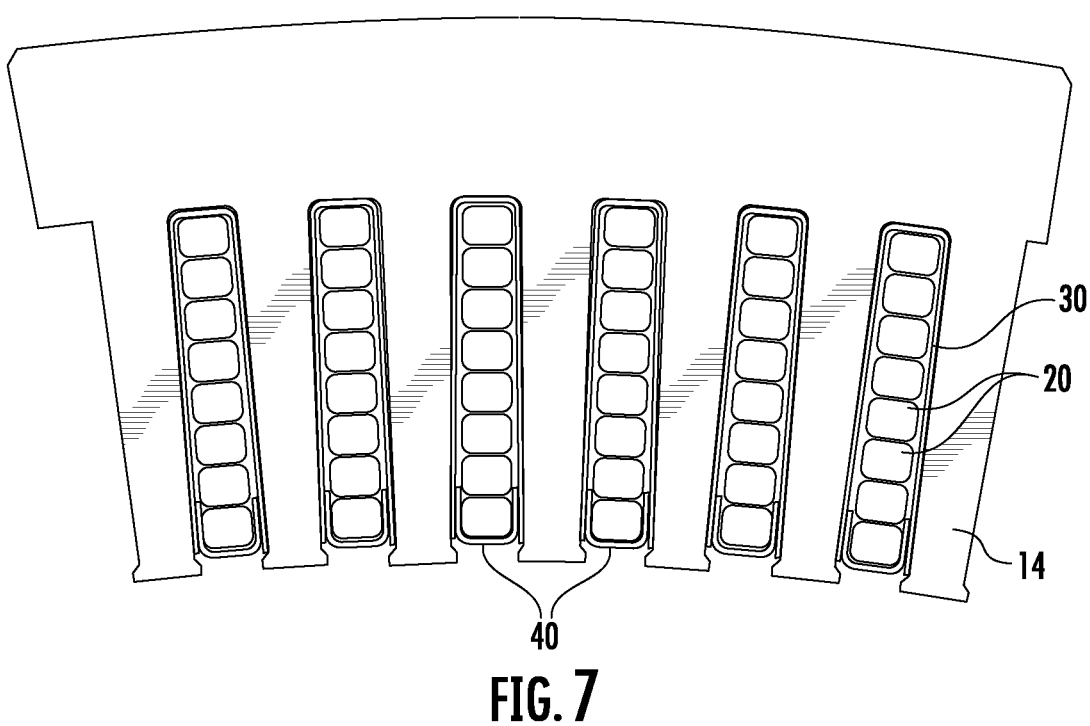
FIG. 7 is a cross-sectional view of a portion of a stator assembly including the slot of FIG. 6 and several neighboring slots.
Figure 8:
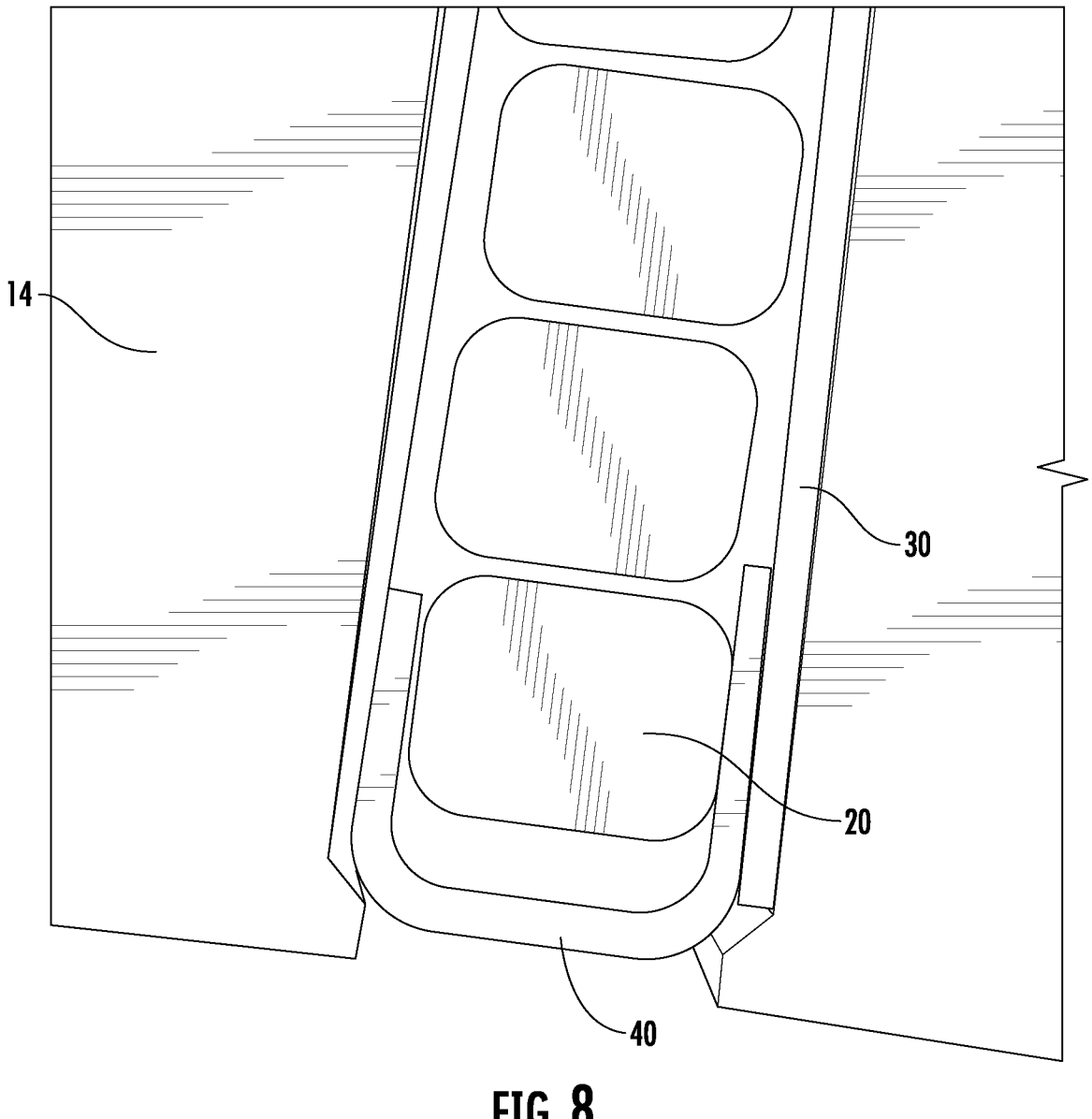
FIG. 8 is a cross-sectional close-up view of the stator slot of FIG. 6 with the wedge moved radially inward but trapped in place by minicaps provided on the teeth of the stator.

FIG. 6 shows a photograph of one slot of an exemplary finished stator arrangement, including a wedge 40 positioned in the slot. FIG. 7 shows a photograph of six slots of the finished stator arrangement, each slot including eight conductors 20 in the slot arranged in a single-file line. FIG. 8 shows a photograph of one wedge retained in the slot after some time. As shown in FIG. 8, the legs of the wedge are press-fit/friction-fit against the slot walls. FIG. 8 also shows the wedge 40 abutting the minicaps 18, thus preventing the wedge 40 (and any conductors outward from the wedge 40) from sliding inwardly to the inner diameter of the stator. FIG. 8 further illustrates a compressed right leg of the wedge such that the right leg is thinner than the bridge of the wedge.

Further steps and/or different configurations of the stator assembly in addition to those disclosed above are also contemplated in various embodiments. As a first example, after the stator is assembled, the conductors may be varnished in place. The varnish also helps to retain the wedges in place. As another example, because the wedge legs typically require sufficient column strength to slightly bend, but not buckle during insertion, various embodiments of the wedge may call for a minimum thickness such as greater than 0.15 mm thick.

Although the various embodiments of the stator assembly with wedges in the slots have been provided herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by any eventually appended claims.

What is claimed is:

1. A stator for an electric machine comprising:
a stator core defining an axial direction, a first end, and a second end, the stator core including an outer diameter wall and a plurality of teeth extending radially inward from the outer diameter wall with minicaps positioned at radially inward ends of teeth and extending in a circumferential direction, wherein a plurality of slots are formed between the teeth, each of the plurality of slots extending from the first end to the second end of the stator core and defining a slot opening on a radially inward portion of the stator core between a pair of minicaps, wherein a width of each slot opening is less than a width of each slot;
a plurality of conductors positioned in each of the slots, the plurality of conductors including a radially innermost conductor defining a first side and an opposite second side of the radially innermost conductor;
a wedge positioned in each slot of the stator core radially inward from the plurality of conductors positioned in said slot, the wedge including a first leg positioned on one side of said slot, a second leg positioned on an opposite side of said slot, and a bridge connecting the first leg to the second leg, wherein the bridge spans across the slot opening and a radially inward side of the bridge faces a radially outward side of the pair of minicaps; and
a plurality of slot liners positioned in a plurality of slots, each slot liner open at the slot opening of an associated slot and including a first side on the one side of the associated slot and a second side positioned on a second side of the associated slot such that the plurality of conductors are positioned between the first side and the second side of the slot liner;
wherein the first leg of the wedge is positioned between and engages the first side of the slot liner and the first side of the radially innermost conductor in the associated slot, and wherein the second leg of the wedge is positioned between and engages the second side of the slot liner and the second side of the radially innermost conductor in the associated slot.

2. The stator of claim 1 wherein the wedge is friction fit in the slot with the first leg wedged on one side of said slot and the second leg wedged on the opposite side of said slot.

3. The stator of claim 2 wherein the plurality of conductors in each slot are arranged in a single-file line extending in a radial direction.

4. The stator of claim 3 wherein the wedge is flexible and comprised of an electrically insulative material.

5. The stator of claim 2 wherein the first leg of the wedge is compressed and is thinner than the bridge of the wedge.

6. The stator of claim 1 wherein each slot has a larger width at a position immediately radially outward from the pair of minicaps than at a radial midpoint of the slot.

7. The stator of claim 6 wherein each tooth of the plurality of teeth is tapered circumferentially inward at a position radially outward from the minicaps.

8. The stator of claim 1 wherein the first leg of the wedge is at least 2 mm long and at least as long as a radial thickness of the innermost conductor in the associated slot.

9. The stator of claim 8 wherein the first leg of the wedge contacts the radially innermost conductor and a radially inner penultimate conductor without contacting any additional conductors in the associated slot.

10. The stator of claim 1 wherein the wedge is at least partially comprised of a plastic or thermoplastic with a high column strength.

11. The stator of claim 1 wherein the wedge is longer than the slot liner in the axial direction in the associated slot.

12. The stator of claim 1 wherein the bridge of the wedge is not in contact with the pair of minicaps in the associated slot.

13. An electric machine comprising:
a rotor; and
a stator separated from the rotor by an airgap and defining an axial direction, the stator comprising:
    a stator core including a plurality of slots, each slot including an opening;
    a winding arrangement formed by conductors extending through the slots of the stator core;
    a plurality of slot liners positioned in the plurality of slots, each slot liner including a first side positioned on one side of an associated slot and a second side positioned on a second side of the associated slot such that the conductors in the associated slot are positioned between the first side and the second side of the slot liner; and
    a plurality of wedges positioned in the slots of the stator core, wherein at least a portion of each wedge is positioned radially outward from an opening of the associated slot, wherein each wedge includes a first leg positioned between the first side of the slot liner and a radially innermost conductor in the associated slot, a second leg positioned between the second side of the slot liner and the radially innermost conductor in the associated slot, and a bridge extending between the first leg and the second leg, wherein the bridge blocks an opening to the associated slot, and wherein each wedge is friction fit in the slot with the first leg wedged between the first side of the slot liner and a first side of the radially innermost conductor on one side of said slot and the second leg wedged between the second side of the slot liner and a second side of the radially innermost conductor on an opposite side of said slot.

14. The electric machine of claim 13 wherein each of the plurality of slots is a semi-closed slot defined by minicaps on a radially inward side of the slot, wherein each wedge is positioned completely radially outward from the minicaps on the radially inward side of the slot, wherein a width of each conductor is less than a width of the associated slot, and wherein a width of the bridge is greater than the width of the opening to the associated slot.

15. The electric machine of claim 14 wherein the first leg of each wedge is longer than a radial thickness of each conductor in the associated slot.

16. A method of making a stator for an electric machine comprising:
    inserting conductors into slots of a stator core, the stator core defining an axial direction, a circumferential direction, and a radial direction, the stator core including an outer diameter wall and teeth extending radially inward from the outer diameter wall with minicaps positioned at radially inward ends of the teeth and extending in the circumferential direction, wherein the slots are formed between the teeth, each of the slots defining a slot opening on a radially inward portion of the stator core between a pair of the minicaps, wherein a width of each slot opening is less than a width of each slot radially outward from said slot opening, wherein the conductors are inserted into the slots of the stator core through the slot openings;
    inserting slot liners into the slots such that, for each slot liner, a first side of said slot liner is positioned on one side of an associated slot, a second side of said slot liner is positioned on an opposite side of the associated slot, and the conductors in the associated slot are positioned between the first side and the second side of the slot liner; and
    inserting wedges through the slot openings in a radial direction and into the slots such that in each slot:
        a first leg of a wedge is positioned between the one side of the slot liner and a radially innermost conductor in the slot,
        a second leg of the wedge is positioned between the opposite side of the slot liner and the radially innermost conductor in the slot,
        a bridge of the wedge blocks the slot opening, and
        the wedge is friction fit in the slot with the first leg wedged between the first side of the slot liner and a first side of the radially innermost conductor on the one side of said slot and the second leg wedged between the second side of the slot liner and the second side of the radially innermost conductor on the opposite side of said slot.

17. The method of claim 16 further comprising positioning a guide fixture adjacent to one of the slots prior to inserting the wedge into said one of the slots.

18. The method of claim 17 wherein the guide fixture comprises a through-hole including a first opening on a radially inward side of the guide fixture that is larger than a second opening on a radially outward side of the guide fixture.

19. The method of claim 18 wherein the conductors are inserted through the slot openings in the radial direction, and wherein a width of the second opening is less than a width of each slot opening.

20. The method of claim 19 wherein a width of the through-hole is gradually tapered between the first opening and the second opening.

21. The method of claim 20 further comprising inserting the wedge in the through-hole of the guide fixture with a bridge of the wedge positioned closer to the first opening than the second opening, and the first leg and the second leg of the wedge extending from the bridge towards the second opening.

22. The method of claim 21 wherein inserting wedges through the slot openings and into the slots includes inserting a pusher tool through the through-hole in the guide fixture such that the wedge in the through-hole is forced past the second opening, past the slot opening, and into the slot.

* * * * *